United States Patent

Argyres et al.

[15] 3,643,823
[45] Feb. 22, 1972

[54] MACHINE FOR UNLOADING RETORT CRATES

[72] Inventors: George Argyres, San Leandro; Donald Clendenen, Fremont, both of Calif.

[73] Assignee: Gerber Products Company, Fremont, Mich.

[22] Filed: Aug. 1, 1969

[21] Appl. No.: 846,838

[52] U.S. Cl. .................................................214/310, 214/8.5 F
[51] Int. Cl. ..........................................................B65g 65/34
[58] Field of Search..............................214/310, 8.5 A, 8.5 F

[56] References Cited

UNITED STATES PATENTS

| | | | |
|---|---|---|---|
| 2,466,544 | 4/1949 | Harred | 214/6 D X |
| 2,888,131 | 5/1959 | Allen | 214/1 BC |
| 3,198,361 | 8/1965 | Krupp | 214/310 |
| 3,478,899 | 11/1969 | Pitchford et al. | 214/8.5 A |

Primary Examiner—Albert J. Makay
Assistant Examiner—John Mannix
Attorney—Townsend and Townsend

[57] ABSTRACT

A machine for unloading retort crates of the type wherein successive stacked layers of containers can be exposed above the crate sidewalls for unloading by elevating the false bottom of the crate with respect to its sides. A bail mounted to the machine sweeps elevated and exposed layers of containers off the crate and onto an adjoining, moving conveyor. The bail in sweeping provides the containers with a substantially uniform acceleration to the conveyor speed to minimize the possibility of tipping the individual food containers in their transfer from the retort crate to the conveyor. The containers are free floating in their movement with respect to the bail so as to minimize the tendency of the individual containers to be broken or damaged during sweeping and to permit the containers during movement of the bail to frictionally orient themselves into a compacted mass. Provision is made to drive the bail by direct coupling to a single hydraulic cylinder.

5 Claims, 6 Drawing Figures

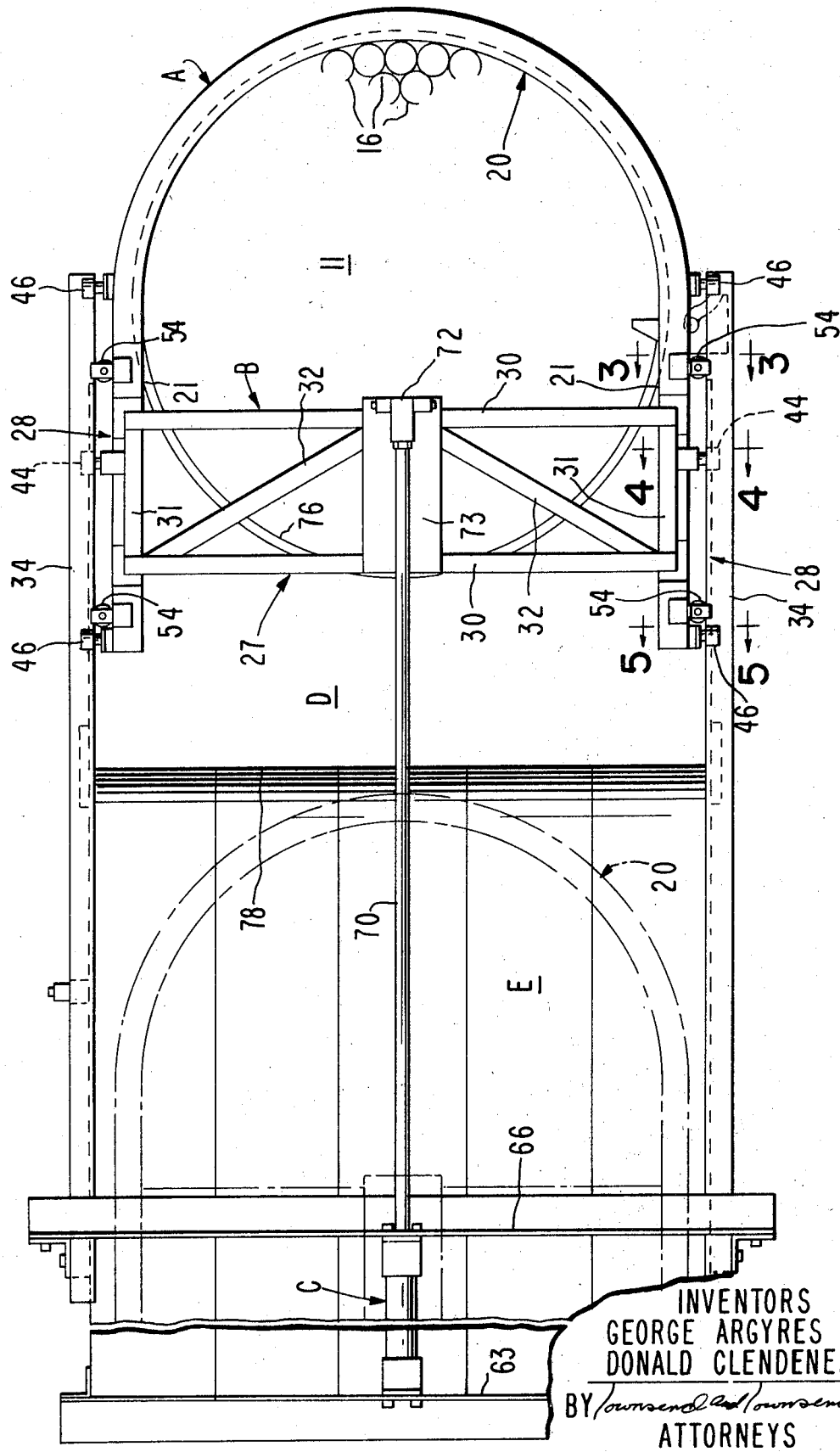

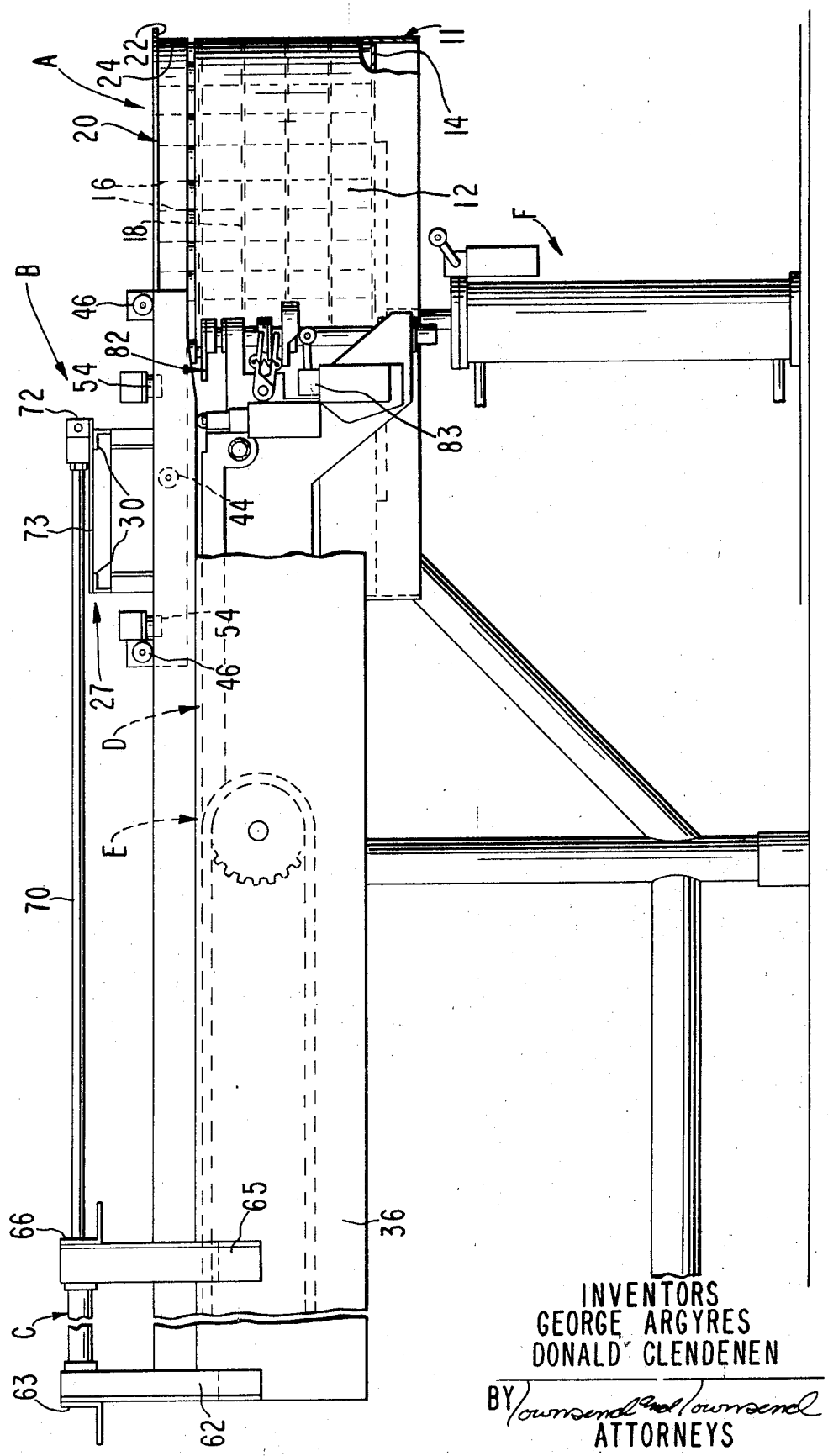

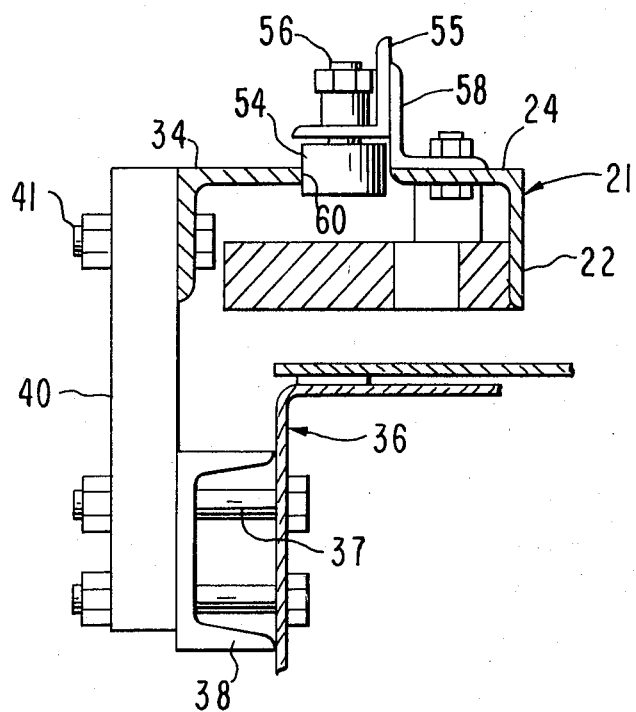
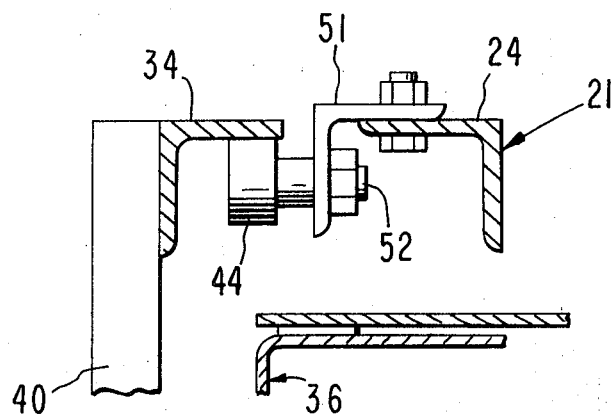
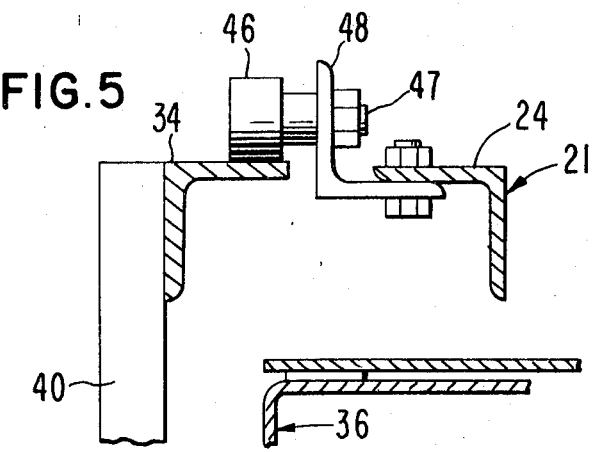

MACHINE FOR UNLOADING RETORT CRATES

This invention relates to a new and improved machine for unloading retort crates of the type used in the heat processing of containers for food products. More particularly, the invention herein relates to a new and improved bail and apparatus for powering movement of the bail in which successive layers of food containers can be moved from a stationary position on a retort crate to a moving conveyor with minimum probability of damage to the containers.

One method for heat processing the contents of small individual containers is to provide crates for holding the containers. These crates, after loading of the containers into successive stacked layers therein, are positioned in a retort and subjected to heat and pressure for a predetermined period of time and then removed and unloaded. This type of crate is used particularly for small containers, such as jars and cans of infant foods.

The crates used in retorting comprise cylindrical baskets having upwardly sliding bottoms and provided with handles at the top used to lift the crates from the loading station to the retort and thence to the unloading station. A first layer of containers is filled onto the bottom of the crate and thereafter a perforated separator is placed over the top of this lowermost layer of containers. A second layer of containers is placed on the perforated separator with a second perforated separator being placed upon the top of this second layer. The placement of the layers and separators is sequentially repeated until the capacity of the crate is attained.

Machines for unloading these types of retort crates have heretofore been known (see Krupp U.S. Pat. No. 3,198,361, entitled "Machine for Unloading Retort Crates"). Generally, in these types of machines, the retort crate is placed on an elevator, which elevator gradually elevates the false bottom of the crate and consequently the successive layers of food containers therein above the sidewalls of the crate. When a layer of containers is clear of the crate sidewalls, the layer is swept and slideably moved over the separator surface on which it rests and onto a moving conveyor.

Machines designed for the sweeping of groups of containers from one surface to another have theretofore included several disadvantages. First, before the groups of containers are swept, they are often gripped between two members of the machine. Usually these members include a bail on one side of the group of containers and a small gathering arm or band on the opposite side of the group of containers. While such gripping between the bail and the gathering arm is intended to maintain individual containers in each layer in an upright, compressed mass, damage to the individual container in each layer sometimes occurs. Often the irregular distribution of the group of containers grasped between the bail and gathering arm results in gripping forces exerted through the gathering arm and bail being concentrated on one or two containers with resultant breaking or cracking of their sidewalls and seal. Moreover, such gripping prevents the layers of containers when subsequently moved by the bail from slideably moving with respect to one another into a compact and solid unitary mass which can be processed subsequently with greater ease.

Moreover, machines designed for the sweeping of groups of containers onto a conveyor have often incorporated imperfect acceleration of the groups of containers from their stationary disposition to the moving conveyor. Either the containers are moved to a new speed which is too slow or alternately to a new speed which is too fast with respect to the moving conveyor. This difference in speed between the bail on one hand and the moving conveyor on the other hand results in the top of each container being urged to travel at one speed, the bottom of each container being urged to travel at a second speed and a tilting moment applied to the containers. With such tilting moment applied, the individual containers in the swept groups frequently tip from their desired upright position to an undesired sideways position where they cannot properly enter downstream conveyors for such processing steps as single filing, labeling, checking of the seal, and cleaning.

Finally, the sweeping members or bails heretofore have been driven with elaborate apparatuses which power the movement of the bail with respect to the machine table and conveyor to which they are attached. These drives, commonly including drive members on either side of the bail, are designed to prevent binding or wedging of the bail during its sweeping movement. Unfortunately, these elaborate drives include chains, sprockets, and associated shafts add to the mass of the moving parts, cause unnecessary power to be consumed, and complicate unnecessarily such machinery.

An object of this invention is to provide a simplified bail for unloading retort crates in which the layers of successive containers interior of the crate are moved by an advancing bail without being gripped. Typically, the bail is initially positioned with the layer of containers between itself and the moving conveyor. The bail is open and unobstructed in the direction of the conveyor. Thereafter, and in the absence of any gripping function between the forward or leading edge of the containers and the bail, sweep of the bail towards the moving conveyor is initiated with the result that the successive layers of containers are swept off the crate and onto the moving conveyor with a minimum probability of damage.

An advantage of this apparatus is that in the absence of a gripping force between the bail and a member such as a gathering arm, the possibility of breaks or cracks occurring in the containers during the unloading process is minimized.

A further advantage of this apparatus is that during the sweeping movement of the bail the containers in each successive layer are free to move with respect to one another during the sliding movement of the bail. This freedom of motion permits the containers to naturally orient themselves into a compacted mass where they can be more efficiently handled in subsequent processing.

A further object of this invention is to provide substantially constant acceleration of the containers from their stationary position on the retort crate up to the speed of the conveyor on which they are being swept. This gradual acceleration subjects the containers to minimum impact. Moreover, as the containers are released by the bail at the speed of the conveyor, the individual food containers are not subjected to a tipping or tilting movement as they move onto the conveyor.

A still further object of this invention is to provide the bail with a new mounting or frame wherein reciprocating movement of the bail can be actuated by a directly coupled hydraulic cylinder without the possibility of mechanical binding to arrest free reciprocating motion.

Other objects, features and advantages of this invention will be more apparent after referring to the following specification and attached drawings in which:

FIG. 1 is a plan view of the bail, machine table and single cylinder drive, the cylinder being broken away for convenience in illustration;

FIG. 2 is a side elevation section of the view of FIG. 1 illustrating the placement of the retort crate on an elevator with a first layer of containers ready for sweeping from the retort crate by the bail;

FIG. 3 is an end elevation section along lines 3—3 of FIG. 2 illustrating the rearward suspension of the bail frame;

FIG. 4 is an end elevation section along lines 4—4 of FIG. 2 illustrating the medial suspension of the bail frame;

FIG. 5 is a side elevation section along lines 5—5 of FIG. 2 illustrating the forward suspension of the bail frame.

Figure 6:
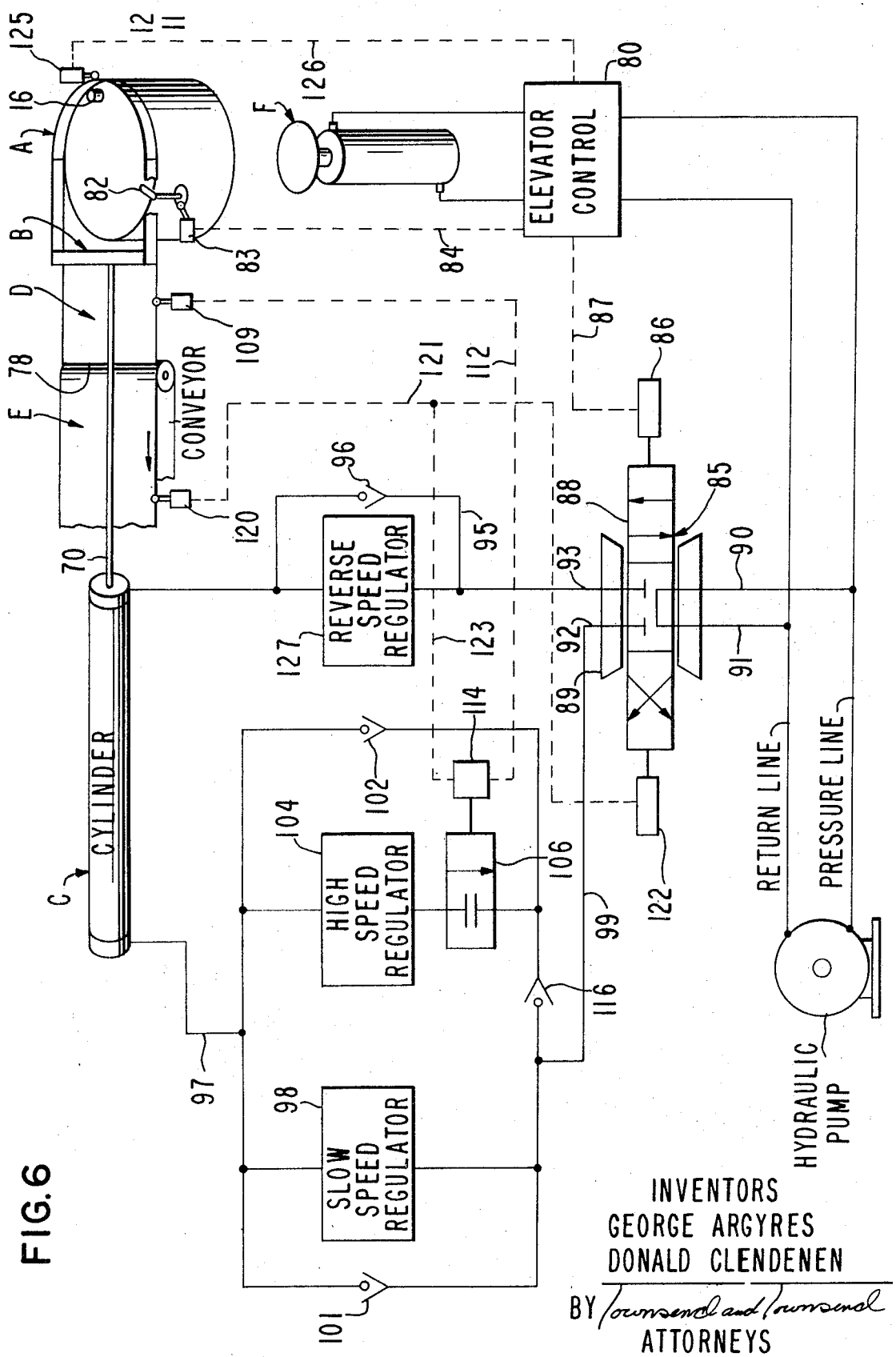
FIG. 6 is a schematic diagram illustrating the hydraulic apparatus sufficient for powering movement of the bail.

The present invention is used in unloading retort crates similar to the crate 11 illustrated in FIGS. 1 and 2. Such crates have cylindrical sides 12 and are provided with apparatus whereby the sides of the crate may be grasped to lift the crate by a crane or other conveyoR. The false bottom 14 of the crate is vertically slideable inside of the cylindrical sides 12. When the sides of the crate are held stationary, pushing upwardly on bottom 14 results in layers of containers 16 being brought up beyond the lever of the upper side edge of sides 12 for unloading.

Each layer of the crates consists of the plurality of horizontal layers of containers 16. Containers 16 may be of various types, but as herein illustrated, comprise glass jars having metal caps of the type used in packing infant food. Such containers are relatively small. Typically the containers 16 are loaded in layers into the crate 11 with their axis upright. Between each layer there is placed a perforated separator or tray 18. This separator or tray 18 assures that the individual layers are maintained spatially separated and provides a surface over which the containers of each layer can slide when removal from the retort crate by the bail is effected.

The machine which is the subject of the present invention provides for unloading crate 11 in position at one end thereof in successive layers of containers 16. As is important to the improvements provided by this invention, a bail A mounted to a bail frame B is swept by a single hydraulic cylinder C over the surface of the retort crate, sweeping an elevated layer of containers 16 onto the table D of the retort crate unloading machine and thence onto moving conveyors E. After each sweep of bail B has occurred, the bail reciprocally moves rearwardly to overlie the rear sidewalls 12 of the retort crate and elevator mechanism F elevates the bottom of crate 11 to expose sequentially the next successive layer of containers 16 within the retort crate.

Bail A comprises a single piece of angle iron bent in a semicircular arc 20 over 180° of curvature. This bail is here shown with a radius of curvature wherein it can extend slightly beyond the sidewalls 12 of the retort crate 11. Arc 20 terminates its curvature where it is conjoined to bail frame B on either side of the retort crate 11 and table D of the machine. The angle bar comprising the bail is bent with its downward angle member 22 (illustrated in FIG. 3) protruding inwardly towards the containers 16. This downwardly protruding angle 22 provides a vertical surface along which the bail can contact the sidewalls of the containers 16 disposed on the retort crate.

Bail A has two attachment members 21 which extend parallel to the respective sides of bail frame B. These members, extend the length of frame B and at horizontal angle member 24 of bail A provide for attachment of the bail to bail frame B.

Bail frame B, generally described, includes a transverse brace frame 27 spanning the two sides of the bail with two wheel mount sections 28 on either side thereof. Frame 27 is a rectangular member having two transverse brace members 30 with two longitudinally extending members 31. As constructed, members 30 form the elongate parallel sides of a rectangular frame construction with members 31 enclosing the ends of the rectangle parallel to wheel mount sections 28 on either end thereof. To reinforce transverse brace frame 30, two diagonal braces 32 extend from the forward corners of brace frame 27 rearwardly to the medial portion of the rearward transverse brace member 30. These members provide the requisite rigidity to permit cylinder C to reciprocally move the frame in the vicinity of rearward brace member 30 without causing bending.

Bail frame B moves on two angle iron rails or slideways 34 secure on either side of the table D. With reference to FIG. 3, the mounting of one such rail is illustrated. Typically, a side member 36 of table D has secured at preselected intervals along its length bolts 37, which bolts penetrate a channel bar 38 and are secured to rail support bars 40. Rail support bars 40 are rigidly held by bolts 37 against the flat outside surface of channel bars 38 and extend upwardly above the surface of table D a preselected distance. At the top portion of rail support bars 40, bolts 41 secure rails 34 to the rail support bars 40. As is apparent, bolts 37, channel bars 38, rail support bars 40, and bolts 41 are placed along the rails 34 at preselected intervals, these intervals being sufficient to maintain the rails rigidly placed parallel to the longitudinal sides of table D.

Bail frame B and its supported bail A, as they are reciprocally moved by cylinder C over retort crate 11 and table D, must be prevented from moving upwardly or downwardly with respect to the retort crates. This is achieved by horizontal rollers 44 and 46 along the sides of the wheel mount section 28 of bail frame D.

Referring to FIG. 5, rail 34 is shown having one roller 46 moving over the upward surface of rail 34. Roller 46 is interconnected to bail frame B by a threadedly secured bolt 47 securing roller 46 to an angle iron 48 along the vertically extending section thereof. Angle iron 48 is in turn fastened at its horizontally extending section to the bale at horizontal angle member 24. As shown in the view of FIG. 1, rollers 46 are disposed at the four corners of bale frame B, their attachment being identical to that illustrated in FIG. 5.

Intermediate rollers 46 and riding on the surface of rails 34, are paired horizontal rollers 44. Attachment of rollers 44 is illustrated in the detail of FIG. 4. Rollers 44, are threadedly secured by bolts 52 and angle iron 51 at the vertically extending portion thereof. Angle iron 51 is in turn fastened to the upper surface of the horizontal angle member 24 of bail A, this connection here shown being made by means of a bolt. As shown in FIG. 1, rollers 46 contacting the under surface of rails 34 are positioned intermediate rollers 44.

Rollers 44 and 46 cooperate to prevent tilting of bail frame B out of the horizontal plane along which rails 34 are disposed. Typically, the supported movement of bail A will cause a moment to be exerted on bail frame B tending to move the frame B and its attached bail A out of a horizontal disposition with respect to the retort crate 11, the table D and moving conveyors E over which the bail slides. Such movement will be opposed by rollers 44 on the top surface of rails 34 and rollers 46 on the under surface of rails 34, these rollers being vertically spaced to grip the rails therebetween.

In addition to the tendency of bail A to move upwardly and downwardly, it has been found that the reciprocating bail A and bail frame B can bind with respect to the rails 34. Such binding occurs when one side of frame B moves forwardly in advance of the other side of the frame B during reciprocating movement of the bail and frame. This binding movement is prevented by paired vertical rollers 54 on each wheel mount section 28 of bail frame B.

The attachment of one vertical roller 54 is illustrated in the detail of FIG. 3. Typically, vertical rollers 54 are attached by bolts 56 to the horizontally extending section of an angle bar 55. The vertically extending section of angle bar 55 is welded in back-to-back relation to the vertically extending portion of a second angle bar 58. Second angle bar 58 at its horizontal member in turn attaches to the upward surface of the horizontally extending angle member 24 of bale A. As is shown in the detail of FIG. 3, roller 54, first angle 55, and second angle 58 are all spaced in elevation with respect to the horizontal angle member 24 of bail A so as to dispose rollers 54 at the flattened vertical inside surface 60 of rail 34.

A first pair of rollers 54 are disposed at the leading portion of bale frame 54, one roller contacting the left-hand rail 34, the other roller contacting the right-hand roller 34. Likewise, a second pair of rollers 54 is disposed rearwardly of the bail frame, one roller contacting the left-hand rail 34 and the other roller contacting the right-hand rail 34. As disposed in this essentially rectangular configuration, rollers 54 prevent one side of the bail frame B advancing with respect to the other side of bail frame B and arrests any tendency of the frame to wedge between the rails 34 with resultant stoppage of the desired reciprocating movement.

Bail frame B in its reciprocal movement is powered by a hydraulic cylinder C, shown broken away in the views of FIGS. 1 and 2. Typically, the end of hydraulic cylinder C, remote from bail A, is fastened to sides 36 of table D by two rearward vertical supports 62 holding a transverse angle iron 63 over the topmost section of the table. Similarly, the end of hydraulic cylinder C closest to bail A is fastened to sides 36 of table D by two forward vertical supports 65, holding a transverse angle iron 66. Angle irons 63, 66 and cylinder C are all spaced above table D to permit unloaded container 16 to pass thereunder.

Cylinder rod 70 extends outwardly from cylinder C to bail frame B. This cylinder rod attaches at a clevis assembly 72 extending upwardly from a plate 73 secured across the bail frame B. As should be apparent, when cylinder C is actuated to move rod 70 inwardly and outwardly therefrom, bail A through movement of bail frame B is urged to move over retort crate 11, table D and moving conveyors E. Insofar as the actuation of this movement is necessary to understand this invention, reference will be made to FIG. 6.

Referring to FIG. 6, hydraulic cylinder C is schematically shown interconnected to bail frame B at cylinder rod 70. Supported bail A is shown here overlying the sidewalls 12 of retort crate 11. Before beginning the description of the circuit schematically shown in FIG. 6, several observations can be made regarding the sweep of bail A over retort crate 11, table D and conveyor E.

Cylinder C through rod 70 provides bail A with a movement from the position shown in FIG. 6 to a second position wherein the bail A completely overlies moving conveyor E. Such movement causes the individual containers 16 to be swept over the surface of the separator layer interior of the retort crate in which they are stacked, onto the surface of table D and thence onto the moving conveyor E. At the completion of the sweep of bail A, it is preferred that no containers are left standing on table D.

Table D is provided with an edge 76 disposed towards retort crate 11, which edge is semicircular and of a radius of curvature slightly greater than the radius of curvature of the inside of sidewalls 12 of retort crate 11. This radius of curvature permits the individual containers 16 interior of the retort crate 12 to be swept towards and onto table D without passing over a spatial interval which will cause the containers 16 to be overturned or otherwise disturbed from their upright orientation interior the retort crate.

At the rearward table edge 78, table D terminates immediate the moving conveyors E. Similar to table edge 76, table edge 78 preserves a small spatial interval between the moving conveyor E and the table; this small interval permitting the containers to move onto the surface of the conveyor without being overturned.

Conveyor E is typically composed of a plurality of individual conveyors in side-by-side relation. As illustrated in FIG. 6, these conveyors are shown only at their end towards retort crate 11. Typically, the conveyors transport the unloaded containers 16 away from the unloading apparatus herein illustrated for further processing (not shown).

Initially, retort crate 11 is placed so as to be held overlying elevator mechanism F generally in the position shown in FIG. 2. Such placement is effected by lowering the table of elevator F through the elevator control circuit 80, crate 11 then being held at its sidewalls 12 in a position where the upmost edge of the sidewalls is immediately below the path of bail A.

Assuming crate 11 is placed overlying elevator F, it then becomes necessary to elevate the layers of containers sequentially into position for sweeping by bail A. Such elevation is accomplished by apparatus described fully in Krupp U.S Pat. No. 3,198,361 entitled "Machine for Unloading Retort Crates". In the interests of brevity, it will suffice to say that when elevator control 80 actuates elevator F to raise bottom 14 of retort crate 11 upwardly, arm 82 moves inwardly to the uppermost perforated layer on which a layer of containers 16 are stacked. Arm 82 actuates a limit switch 83 to stop further upward movement of elevator F when the perforated layer is immediately below the sweep of bail A. Typically, limit switch 83 communicates a signal to the elevator control through circuitry schematically illustrated as broken line 84. Elevator control 80, upon receiving such a signal, shifts sweep control valve 85 to the forward position by actuating valve controller 86 through circuitry here schematically illustrated as broken line 87.

Sweep control valve 85 is of the three-position variety. Typically, a valve block 88 movable within the interior of a housing 89 is provided with three positions of registry with inlet ports 90 and 91 and outlet ports 92 and 93. In the medial position here shown, valve 85 communicates ports 90 and 91 allowing hydraulic oil to freely circulate between the inlet ports.

When valve block 88 is moved to the left, apertures interior of the valve block communicate inlet ports 90 with outlet port 93, and inlet port 91 with outlet port 92. Alternately, when block 88 is shifted to the right position of registry, inlet port 90 is communicated with outlet port 92 and inlet port 91 is communicated with outlet port 93.

When elevator control 80 communicates its signal through circuitry 87 to valve controller 86, the controller will shift valve block 88 to its right-hand position of registry; the pressure line from the hydraulic pump will be connected across inlet 90 to outlet 93 and the return line to the hydraulic pump will be connected across outlet 92 to inlet 91. In such a position, oil under pressure from the hydraulic pump will flow through line 93, bypassing reverse speed regulator at bypass line 95 and check valve 96 into the forward portion of cylinder C. Cylinder C will be actuated to begin to move bail A and bail frame B from the position shown in a sweep where containers 16 will be urged towards conveyor E.

When such a sweep commences, hydraulic fluid will be discharged from the rearward portion of cylinder C at line 97. Initially, oil will flow through slow speed regulator 98 (typically a throttling device) to return line 99, outlet 92 and inlet 91, completing the hydraulic circuit. As can be seen, the entire outlet of cylinder C will be initially channeled through slow speed regulator 98; check valves 101 and 102 connected across the slow speed regulator 98 and the high-speed regulator 104 respectively, preventing fluid flow from bypassing the regulator 98. Further, valve 106 connected across the outlet of high-speed regulator 104 will prevent outflowing hydraulic fluid from passing through fast speed regulator 104.

Typically, the inertia of the hydraulic system herein illustrated will cause bail A to gradually accelerate containers 16. This acceleration will continue over a small portion of the sweep of cylinder C and bail A. At the end of this portion of the sweep, movement of bail A toward table D and conveyor E will be detected by a bail movement sensor 109. Preferably this sensor is placed so that the initial acceleration of bail A has just been completed.

Limit switch 109 functions to connect high-speed regulator 104 in parallel with slow speed regulator 98 across outlet lines 97 and 99 from cylinder C. Typically, a signal is communicated by circuitry schematically shown as broken line 112 to actuator 114 of high-speed regulator control valve 106. This valve has a simple control block shifted to permit fluid to pass through high-speed regulator 104 and thence through check valve 116 to outlet line 99. With both slow speed regulator 98 and high-speed regulator 104 connected in parallel across the outlet of cylinder 97, movement of cylinder rod 70 and its connected bail A again accelerates.

Typically, slow speed regulator 98 and high-speed regulator 104 are provided with fluid outflows so that the velocity of sweep A is equal to the forward speed of the conveyor E. As has previously been explained, this speed permits the containers 16 to move onto the conveyor without experiencing any overturning moment. It is preferred that the full acceleration permitted by slow speed regulator 98 and high-speed regulator 104 is achieved before any containers reach conveyor E.

When the full sweep of bail A has occurred, limit switch 120 will detect such motion. Switch 120 through connected circuitry here schematically shown as broken line 121 will actuate controller 122 of cylinder control valve 85 to shift block 88 to the reverse or left-hand position. Simultaneously, controller 114 of valve 106 will return to the closed position actuated by limit valve 120 through circuitry schematically shown as broken line 123.

In the left-hand position, hydraulic fluid from inlet 90 will be channeled to outlet 92. Fluid will flow from outlet 92 through line 99 and check valve 101 and be communicated to the rearward portion 97 of cylinder C. Such fluid movement will cause rod 70 to reverse its track moving bail frame B and bail A rearwardly from over conveyor E to the position shown in FIG. 6. When such rearward movement has been fully attained, a limit valve 125 will detect this sweep and, through circuitry schematically illustrated as broken line 126, will cause elevator control 80 to elevate the next sequential layer of container 16 within retort crate 11 to a position where the next sequential sweep of bail A can occur in precisely the same fashion.

It will be noted that the return sweep of cylinder C is preferably controlled by reverse speed regulator 127. Typically, fluid outflowing from cylinder C at the forward portion will be channeled through reverse speed regulator 127, it being noted that the bypassing circuit will be closed by check valve 96. Such speed regulation is necessary to prevent any unnecessary shock from being transmitted from the cylinder C to the bail frame B and attached bail A.

What is claimed is:

1. A retort crate unloading machine for unloading a retort crate having a vertically slideable false bottom wherein upright glass containers stacked in layers on said false bottom can be successively exposed for unloading by elevation of said bottom to expose sequentially each said layer above the sidewalls of said crate, said apparatus comprising: a moving conveyor; a table having a forward end shaped to receive the forward upper edge of a crate and a rearward end shaped to immediately adjoin the upstream end of said moving conveyor; sweeping means for slideably moving said elevated containers to said conveyor, said sweeping means comprising a semicircular-shaped bail open and unobstructed in the direction of the table to contact said exposed sequential layer of containers at the rearward edge of said containers and to guide said containers as they are slideably moved to the conveyor; bail moving means for reciprocating said bail from a first position wherein said bail is beyond the rearward edge of said crate to a second position wherein said bail overlies said conveyor, said sweep moving means moving said bail and containers from said crate to said second position at a substantially constant rate of acceleration.

2. The invention of claim 1, and wherein, said bail moving means includes: first and second slideways mounted to said table extending longitudinally of said table; bail mounting means including first and second slideway engaging means attached to said bail for slideably engaging said first and second slideways respectively; and, a hydraulic cylinder mounted longitudinally of said table between said slideways.

3. The invention of claim 2 and wherein said hydraulic cylinder is attached to said table at one end and directly connected to said bail mounting means at the other end.

4. The invention of claim 1, and wherein said bail and table has a width at least equal to the width of said crate transverse of said table.

5. The invention of claim 1, and wherein: said conveyor means moves at a constant velocity; and, said sweep moving means moves said bail and containers onto a position overlying the conveyor at the speed of said conveyor.

* * * * *